United States Patent
Hahn

(10) Patent No.: US 6,774,772 B2
(45) Date of Patent: Aug. 10, 2004

(54) ATTENTION CONTROL FOR OPERATORS OF TECHNICAL EQUIPMENT

(75) Inventor: Stefan Hahn, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/886,822

(22) Filed: Jun. 21, 2001

(65) Prior Publication Data

US 2002/0011925 A1 Jan. 31, 2002

(30) Foreign Application Priority Data

Jun. 23, 2000 (DE) .......................................... 100 30 813

(51) Int. Cl.$^7$ ................................................ B60Q 1/00
(52) U.S. Cl. ...................... 340/439; 340/902; 340/903; 340/463; 340/471; 340/555; 340/425.5; 340/929; 340/479
(58) Field of Search ........................... 340/425.5, 815.4, 340/903, 555, 556, 557, 439, 463, 471, 479, 464, 435, 436, 580, 583, 905, 929, 552, 554, 902; 704/275, 272

(56) References Cited

U.S. PATENT DOCUMENTS

| | | | | |
|---|---|---|---|---|
| 4,818,010 A | * | 4/1989 | Dillon | 340/936 |
| 5,432,509 A | * | 7/1995 | Kajiwara | 340/903 |
| 5,801,763 A | | 9/1998 | Suzuki | 348/77 |
| 5,805,119 A | * | 9/1998 | Erskine | 340/705 |
| 5,878,395 A | * | 3/1999 | Bennett | 704/275 |
| 6,184,800 B1 | * | 2/2001 | Lewis | 340/932.2 |
| 6,291,906 B1 | * | 9/2001 | Marcus et al. | 340/903 |
| 6,327,536 B1 | | 12/2001 | Tsuji et al. | 701/301 |

FOREIGN PATENT DOCUMENTS

| | | |
|---|---|---|
| DE | 3328226 | 4/1987 |
| DE | 4201970 | 8/1992 |
| DE | 4334855 | 4/1995 |
| DE | 19539799 | 5/1996 |
| DE | 19603287 | 1/1997 |
| DE | 199 52 506 | * 10/1999 |
| DE | 10030421 | 1/2001 |
| DE | 19952506 | 6/2001 |
| EP | 0 686 865 | * 5/1995 |
| EP | 0686865 | 12/1995 |

OTHER PUBLICATIONS

Funkschau Apr. 1987 "Forschungsprojekt Prometheus: Schneller, sicherer, umweltfreundlicher; Strassenverkehr der Zukunft."

A. Goldbacher in Elektronik 19/1991 "Sicher auf Europas Strassen".

Translation (English to German) of EP Patent EP–0686865.

* cited by examiner

Primary Examiner—Jeffery Hofsass
Assistant Examiner—Daniel Previl
(74) Attorney, Agent, or Firm—Davidson, Davidson & Kappel, LLC

(57) ABSTRACT

For the attention control for an operator of technical equipment, a display device for displaying action-relevant information in the form of images or symbols is implemented in which the duration of the display of the specific image or symbol lies below a conscious and above an unconscious perception threshold of the operator, and in which the specific image or symbol is displayed at those locations of the field of vision of the operator at which objects are located to which his/her attention is to be drawn. The advantage of the present invention consists in that the operator does not need to turn his/her view away from the scene to be monitored and in that he/she is not unnecessarily disturbed by the representation of information.

19 Claims, 4 Drawing Sheets

ATTENTION CONTROL FOR OPERATORS OF TECHNICAL EQUIPMENT

BACKGROUND INFORMATION

The present invention relates to a method and to a device which is suitable for carrying out a method and device for controlling the attention of an operator of technical equipment, having a display device for displaying action-relevant information in the form of images or symbols, the duration of the display of the specific image or symbol lying below a conscious and above an unconscious perception threshold of the operator Sensors which monitor the environment are increasingly used in technical equipment for increasing safety and operating convenience. Due to the rapid development in processor technology and in the miniaturization of integrated components, cameras are meanwhile also available at a reasonable cost.

For these reasons, camera systems are increasingly used in motor vehicles as well. In recent times, one has been working on the use of image sensors which are more sensitive at night than the human eye for improving the sight for the vehicle driver. European Patent Document EP 0 686 865 discloses a night vision system working in the far infrared range. In this connection, the image generated by the system is imaged into the lower part of the windshield. In other attempts, the image data of near infrared systems were imaged via a head-up display on a plane screen in front of the windshield. However, these systems have the negative effect that, on one hand, the vehicle driver must partially turn his/her view away from the actual road scene for monitoring the additional image information and, on the other hand, that the imaged scene partially covers the road scene. It has also turned out to be difficult to impress this additional image information of the infrared system on the driver because it does not correspond to his/her habitual wealth of sensations.

To avoid these disadvantages, it has been proposed not to offer the driver an additional graphical representation of the environment but to overlay an LED line underneath the objects to be set off within a road scene. However, such an overlay creates contrast problems and is extremely disturbing due to the constant presence of additional information within the main direction of view.

SUMMARY OF THE INVENTION

Investigations into the physiology of perception show that the attention of the human being can be guided by short, hardly perceivable changes in contrast. Commonly-owned German Patent DE 199 52 506, published Jun. 7, 2001, describes a system is known in which action-relevant information is offered, via a unit for the display thereof, to an operator of technical equipment below a conscious but above an unconscious perception threshold for a short time. In this manner, it is possible to trigger the attention of the operator without overtaxing him/her by constantly displaying unnecessary information. This is known as "visual priming." While it is not believed necessary to the further understanding of the present invention, the entire disclosure of German Patent DE 199 52 506 is hereby incorporated by reference herein.

An object of the present invention is to find a method and a device which is suitable for carrying out a method for controlling the attention of an operator of technical equipment.

The present invention provides a method for controlling the attention of an operator of technical equipment, having a display device for displaying action-relevant information in the form of images or symbols, the duration of the display of the specific image or symbol lying below a conscious and above an unconscious perception threshold of the operator. The specific image or symbol is displayed at those locations of the field of vision of the operator at which objects are located to which his/her attention is to be drawn.

The duration of the display is adjustable that it can be displayed below a conscious perception threshold and above an unconscious perception threshold of the operator. In this manner, the optical information is presented for such a short period that it cannot be consciously realized, but nevertheless is absorbed by humans. This phenomenon, known as "visual priming" is described, for example, by A. J. Marcel in "Conscious and unconscious perception: Experiments in visual masking and word recognition," Cognitive Psychology 15 (1983), pp. 197–237. A well-known example of this phenomenon is the substitution of specific frames in a film sequence with frames having a completely different content, which cannot be consciously perceived by an observer of the film, but which nevertheless affect the observer's perceptions and/or his later behavior.

This effect is used by the present invention to provide a subliminal warning, subliminal information, or a subliminal impact on the operator of a machine. This makes it possible, for example, to indicate a warning without using a distracting signal, such as lighting an indicator light or sounding an alarm, as is done in conventional warning systems. Though experiments described in German Patent DE 199 52 506, it was shown that the subliminal presentation of action-relevant information on a display in the operator's field of vision effectively sensitized the operator to the presented information. The subliminal presentation thus considerably shortened the reaction time of the operator when the situation for which the operator was unconsciously prepared actually occurred. Moreover, it was found that the operator was not disturbed or distracted by the subliminally presented information. It was therefore concluded that, once an appropriate situation is recognized, action-relevant information can be displayed for a short time without regard to possible negative effects on the operator's actions.

According to the present invention, the specific image or symbol is displayed at least once for a short duration, wherein the duration of the display lies below a conscious perception threshold and above an unconscious perception threshold of the operator. The unconscious perception threshold is defined as the shortest display duration at which the displayed information is unconsciously absorbed, i.e. the displayed information has an effect on the operator's later behavior. The conscious perception threshold is defined as the shortest display duration at which the operator becomes consciously aware of the displayed information.

The perception thresholds may depend on the size and brightness of the presented image or symbol as well as the relative location of the image or symbol in the field of view of the operator (e.g. in the center or near the edge of the operator's field of view). It has been shown that even a momentary presentation of information in the peripheral field of an operator's view can affect the operator's behavior.

In one test arrangement described in German Patent DE 199 52 506, a test vehicle having a controllable CRT display on the dashboard in place of the otherwise typical panel of individual instruments, was modified so as to be able to measure the driver's reaction time to road signs and traffic lights. The reaction times of an adequately large number of subjects were measured both with and without subliminal optical sensitization, To sensitize the subjects, a symbol of a road sign or a traffic light was displayed for a duration of approximately 50 milliseconds on the CRT display before the actual road sign or traffic light appeared in the subject's field of vision. This subliminal sensitization resulted in a significant reduction in the reaction time of the subject of 50 milliseconds as compared to the reaction time without sensitization.

In a second test arrangement described in German Patent DB 199 52 506, a similar test vehicle with a CRT display as instrument panel was allowed to follow a vehicle driving ahead of the test vehicle at 20 to 40 km per hour. The subject was told to actuate the brake pedal as soon as the brake lights of the lead vehicle lit up. Randomly, in half of the cases, a picture of two lit brake lights was flashed in the instrument panel before the brake lights of the lead vehicle actually lit up. The duration of the displayed image was chosen to be so short that the driver did not consciously perceive it. The cases with subliminal sensitization resulted in a significant reduction in the reaction time of 150 milliseconds as compared to the cases without sensitization.

In this context, the object of the present invention may be achieved by a display device for displaying action-relevant information in form of images or symbols, the duration of the display of the specific image or symbol lying below a conscious and above an unconscious perception threshold of the operator, and the specific image or symbol being displayed at those locations of the field of vision of the operator at which objects are located to which his/her attention is to be drawn.

The advantage of the present invention includes that the operator does not need to turn his/her view away from the scene to be monitored and in that he/she is not unnecessarily disturbed by the representation of information.

Advantageous embodiments and refinements of the present invention include that the objects to which attention is to be drawn are at least partially obtained by evaluating infrared sensor data. The duration of the display of the action-relevant information may be varied, and may increase proportionally with the increase of a potential danger. From this certain danger potential, the action-relevant data may displayed for a period which lies above a conscious perception threshold.

The action-relevant information may for example be displayed in the form of light spots, arrows or other pointer symbols pointing to those objects to which the attention of an operator is to be drawn, in the form of borders or underlinings which are displayed around or under those objects to which the attention of an operator is to be drawn, or image segments containing image information obtained via an image-forming sensory system on those objects to which the attention of an operator is to be drawn.

The environmental area which is in the operator's field of vision may be determined via a device and compared to the field of vision of the sensor device used within the framework of the attention control, and the position at which the action-relevant information is to be displayed to the operator may be determined on the basis of this comparison.

The environmental area which is in the operator's field of vision may be determined with knowledge of the invariable geometries and of the current position of variably configurable geometries within the space surrounding the operator. Inside a motor vehicle, the current sitting position and/or the adjustment of the mirror adjuster may be determined for determining the variably configurable geometries. The environmental area which is in the operator's field of vision also may be determined, for example, via a sensor for determining the head position and/or the eye alignment of the operator.

The present invention also provides a device for controlling the attention of an operator of technical equipment, having a display device for displaying action-relevant information in the form of images or symbols comprising sensors for sensing at least a subarea of the area surrounding an operator of a technical system, a data processing system, and a display unit for displaying action-relevant information, the duration of the display of the specific image or symbol lying below a conscious and above an unconscious perception threshold of the operator, wherein a means exists which allows the specific image or symbol to be displayed at those locations of the field of vision of the operator at which objects are located to which his/her attention is to be drawn.

The present invention is suitable for controlling the attention of operators of the most varied technical equipment where persons have to monitor the operational environment and to react to occurring changes.

In the following, the present invention will be exemplarily explained within the framework of its use for controlling the attention of vehicle drivers. In this context, it is particular advantageous to use the method according to the present invention within a system for improving night vision. In this connection, the objects to which attention is to be drawn are at least partially obtained by evaluating infrared sensor data. Thus, it is possible to draw the driver's attention to pedestrians which are detected in this manner also in darkness even before danger to them can be reliably established. In order to not overload the vehicle driver with information, he/she should deliberately be clearly alerted only in the case of danger situations. This clear alert can be brought about by the system, for example, in that the display duration of the images or symbols lies above the conscious perception threshold. In this manner, it is also conceivable to convey different danger potentials to the driver by a simple variation in the duration of the display.

The action-relevant information is advantageously displayed in the form of light spots which are superimposed on the images of the actual objects in the field of vision of the driver. In this connection, it is also conceivable for the light spots to be colored or provided with corresponding textures according to the respective danger potential. In a further advantageous embodiment, the action-relevant information is displayed in the form of arrows or other pointer symbols pointing to those objects to which the driver's attention is to be drawn. It is certainly profitable as well to set off important objects in the form of borders or underlinings. However, it is also possible for action-relevant information to be displayed in an inventive manner in the form of image segments. These image segments can be directly derived from the image information acquired by the image-forming sensory system, it being possible in this context to use the entire image information or only contours. However, it is also conceivable for the image information to be symbolically superimposed prior to display so that always the same symbol is displayed, for example, when a pedestrian is detected. This would help further reduce the overstimulation of the vehicle driver.

To bring the display of the action-relevant image information into cover with the driver's sight of the environment as best as possible, it is conceivable to prevent an additional outlay of processing and a necessary sensory system by assuming, for example, a standardized sitting position and height of a person. However, the method according to the present invention can be profitably developed if the environmental area which is in the operator's field of vision is determined via a device and compared to the field of vision of the sensor device used within the framework of the attention control. The position at which the action-relevant information is to be displayed to the operator can then be determined on the basis of this comparison. For carrying out such a process step, ideally, the environmental area which is in the operator's field of vision is to be determined with knowledge of the invariable geometries and of the current position of variably configurable geometries within the space surrounding the operator. To this end, for example inside a motor vehicle, the current sitting position and/or the adjustment of the mirror adjuster can be detected for determining the variably configurable geometries. However, it is also conceivable to determine the environmental area which is in the operator's field of vision via a sensor for determining the head position and/or the eye alignment of the operator.

In accordance with the explained process steps, a device for carrying out the method according to the present invention is composed at least of sensors for sensing at least a subarea of the area surrounding an operator of a technical system, of a data processing system, and of a display unit for displaying action-relevant information. In an advantageous embodiment, the device further includes a unit which is suitable for determining variably configurable geometries within the space surrounding the operator and/or for determining the head position and/or the eye alignment of the operator.

The data processing system advantageously contains a storage unit in which at least data with respect to the invariable geometries of the space surrounding the operator is stored.

Particularly suitable as the display unit within the device according to the present invention is a head-up display via which the action-relevant information is imaged into the field of vision of an operator. In this context, it is conceivable for the head-up display to be designed in a simple manner in the form of an LED line to image pure line information (such as 'underlinings') into the field of vision of an operator.

BRIEF DESCRIPTION OF THE DRAWINGS

The present invention will be further described with respect to the following drawings, in which.

DETAILED DESCRIPTION

Figure 1:
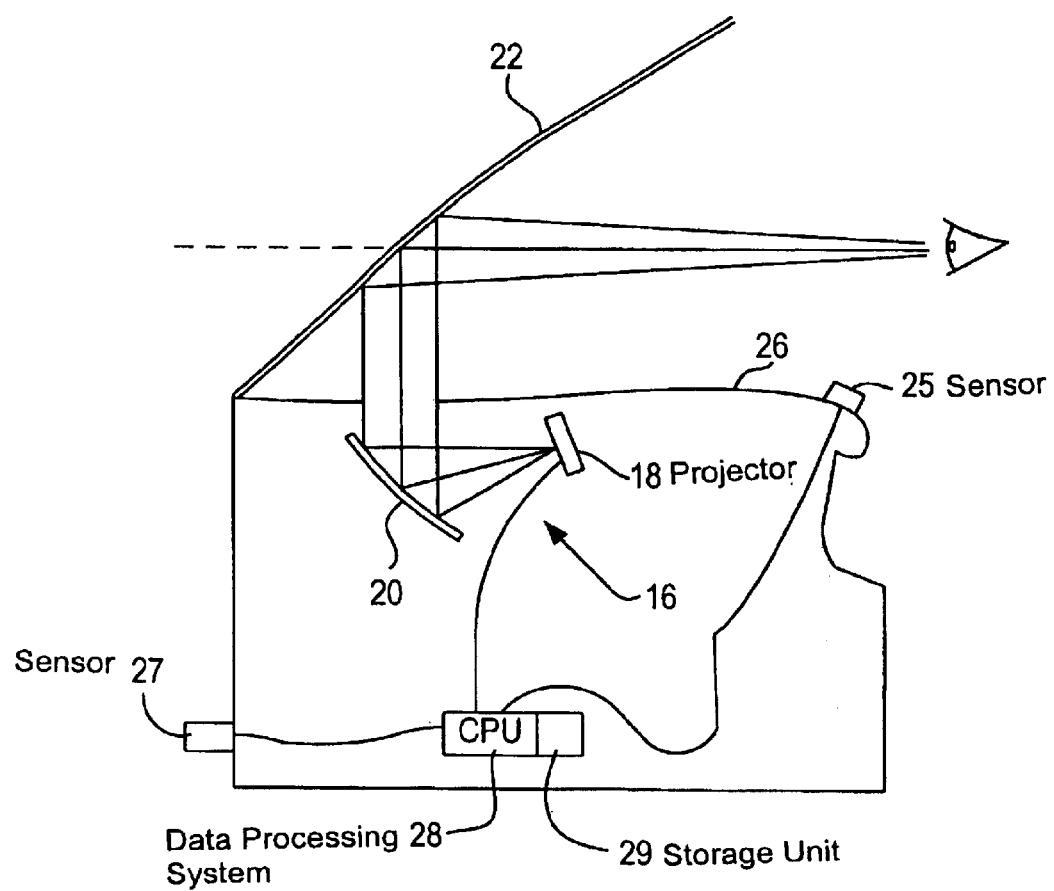
FIG. 1 shows an embodiment of the device of the present invention in an automobile.

FIG. 1 shows a partial side view of the device of the present invention, including a projector 18 for projecting an image 16 for a certain time lying below a conscious and above an unconscious perception threshold of the operator onto a windshield 22. The image 16 can be sent via a mirror 20 onto the windshield. The projector may be located on, in or near a dashboard 26 of an automobile. At least one sensor 27, located for example at the front of the automobile, can send signals to a data processing system 28 having a data storage unit 29. Data storage unit 29 can store information that does not vary, such as passenger cabin configuration data. The images 16 may be formed as a function of data from sensor 27. A sensor 25 can sense data regarding the operator, such as head position, and data regarding the vehicle cabin, such as seat position.

Figure 2:
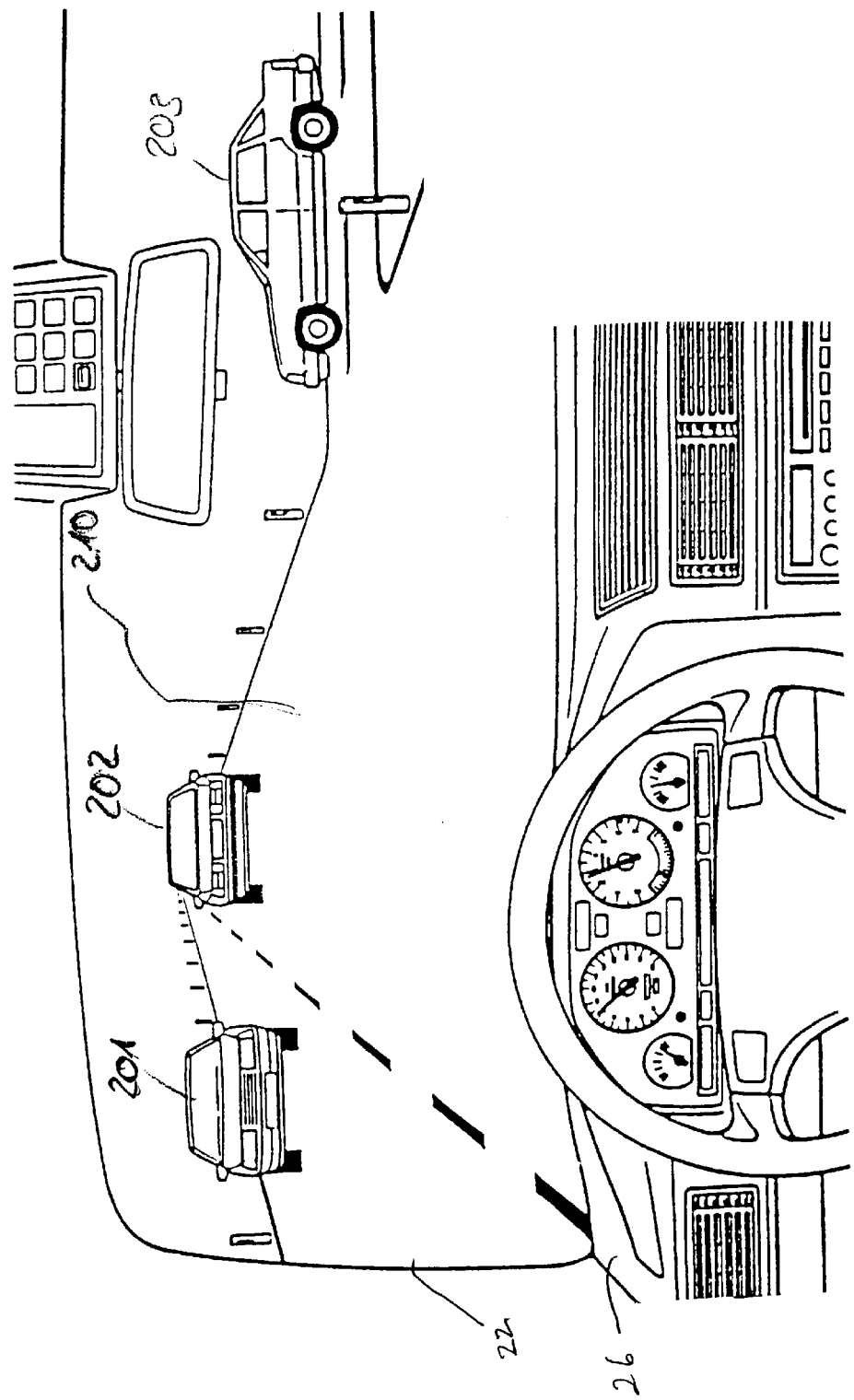
FIG. 2 shows a view of a driver in the automobile with an enhanced display.

FIG. 2 shows a view of vehicle dashboard 26 and windshield 22 as seen by the operator. The street 210 and automobiles 201, 202, 203 may be enhanced according to the method of the present invention by the projector 18, for example by overlay.

Figure 3:
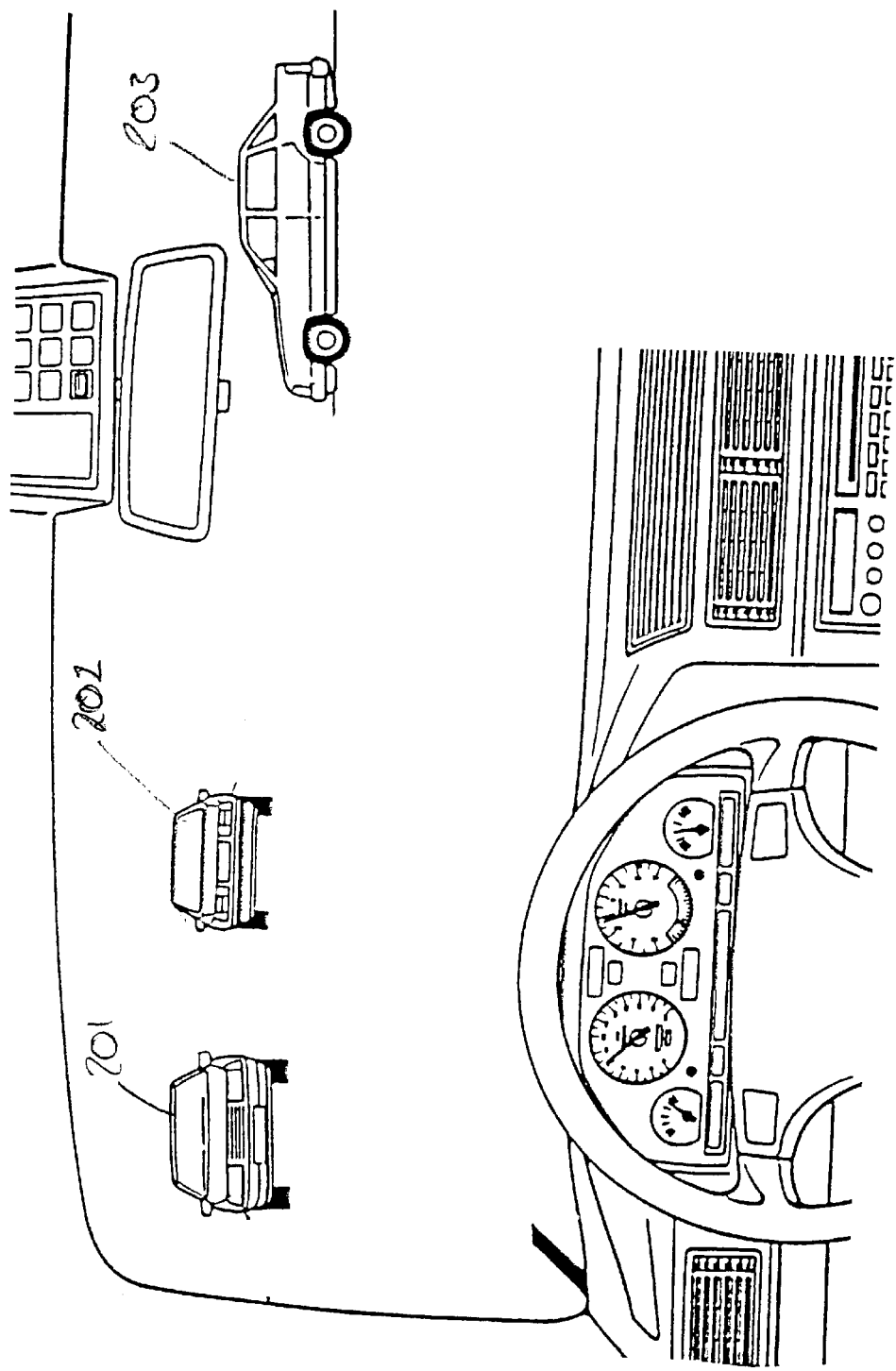
FIG. 3 shows a same view as in FIG. 2, but with only the objects to be enhanced by the method of the present invention being shown.

FIG. 3 shows for example the image as in FIG. 2 but solely showing an overlay to be projected on windshield 22 for a period of time lying below a conscious and above an unconscious perception threshold of the operator. Only automobiles 201, 202 and 203 are enhanced in this version.

Figure 4:
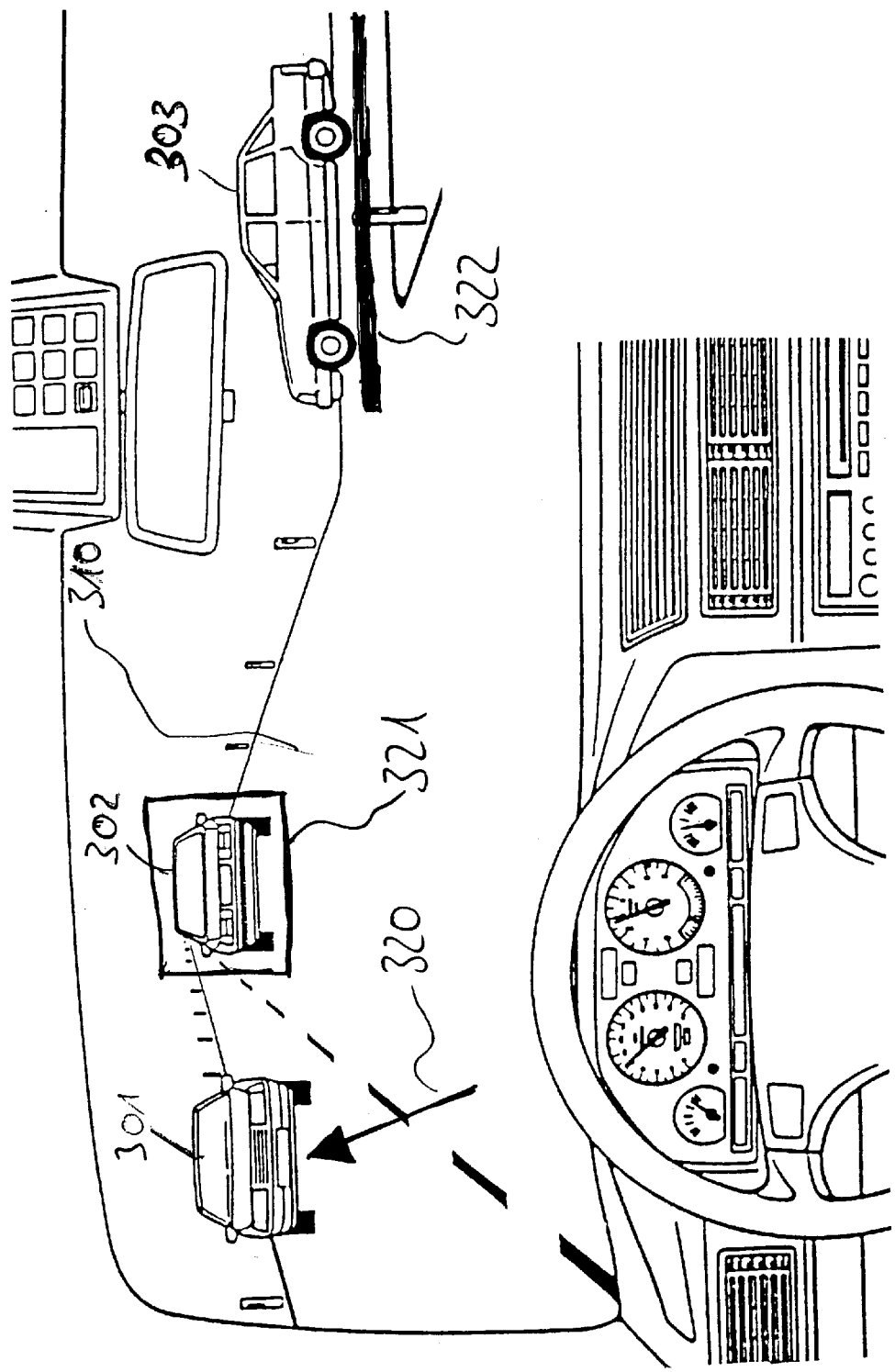
FIG. 4 shows the same view as in FIG. 2 but with the objects to be enhanced without an overlay, but rather through arrows, frames or underlining.

FIG. 4 shows an alternative to the overlays of FIG. 3, with arrows 320 enhancing automobile 301, frame 321 enhancing automobile 302 and underlining 322 enhancing automobile 303. Street 310 may be enhanced by overlay, for example, or not enhanced. Arrows 320, frame 321 and underlining 322 are displayed for a period of time lying below a conscious and above an unconscious perception threshold of the operator

What is claimed is:

1. A method for controlling attention of an operator of technical equipment having a display device for displaying action-relevant information in the form of images or symbols, the operator having a field of vision, the method comprising the steps of:

displaying a specific image or symbol using the display device for a duration lying below a conscious perception threshold and above an unconscious perception threshold of the operator, the specific image or symbol being displayed at locations in the field of vision corresponding to objects to which attention of the operator is to be drawn.

2. The method as recited in claim 1 wherein the objects are at least partially determined by evaluating infrared sensor data.

3. The method as recited in claim 1 wherein the duration is variable.

4. The method as recited in claim 3 wherein the duration increases with an increase of a danger potential.

5. The method as recited in claim 4 wherein when the danger potential reaches a predetermined level, the specific image or symbol is displayed for a period which lies above the conscious perception threshold.

6. The method as recited in claim 1 wherein the specific image or symbol includes light spots.

7. The method as recited in claim 1 wherein the specific image or symbol includes arrows or other pointer symbols pointing to the objects.

8. The method as recited in claim 1 wherein the specific image or symbol includes borders or underlining displayed around or under the objects.

9. The method as recited claim 1 wherein the specific image or symbol includes image segments containing image information obtained via an image-forming sensory system sensing the objects.

10. The method as recited in claim 1 further comprising determining an environmental area in the field of vision of the operator, comparing the environmental area to a sensor field of vision of a sensor device, and determining a positioning of the specific images or symbols as a function of the comparing step.

11. The method as recited in claim 10 wherein the environmental area is determined with knowledge of invariable geometries and of a current position of variably-configurable geometries within a space surrounding the operator.

12. The method as recited in claim 11 wherein, inside a motor vehicle, at least one of a current sitting position and an adjustment of a mirror adjuster are determined for determining the variably-configurable geometries.

13. The method as recited in claim 10 wherein the environmental area in the field of vision of the operator is determined via a sensor for determining at least one of a head position and an eye alignment of the operator.

14. A device for controlling attention of an operator of technical equipment comprising:
- a plurality of sensors, at least one sensor of the plurality of sensors for sensing at least a subarea of an area surrounding the operator;
- a data processing system receiving data from the sensor; and
- a display unit receiving data from the data processing system, the display unit displaying an action-relevant specific image or symbol, the duration of the display of the specific image or symbol lying below a conscious and above an unconscious perception threshold of the operator, the display unit displaying the specific image or symbol at locations of a field of vision of the operator corresponding to objects to which attention of the operator is to be drawn.

15. The device as recited in claim 14 wherein the at least one sensor is capable of determining at least one of variably configurable geometries within a space surrounding the operator, an operator head position and an eye alignment of the operator.

16. The device as recited in claim 14 wherein the at least one sensors is a night vision system.

17. The device as recited in claim 14 wherein the data processing system contains a storage unit storing at least data with respect to a invariable geometries of the area surrounding the operator.

18. The device as recited in claim 14 wherein the display unit is a head-up display.

19. The device as recited in claim 18 wherein the head-up display is designed as an LED line which can be imaged into the field of vision of the operator.

* * * * *